(12) United States Patent
Watts et al.

(10) Patent No.: US 9,223,181 B2
(45) Date of Patent: Dec. 29, 2015

(54) ASSEMBLING A FLEXIBLE DISPLAY

(75) Inventors: James Watts, Ely (GB); William Reeves, Cambridge (GB); Sharjil Siddique, Cambridge (GB)

(73) Assignee: PLASTIC LOGIC LIMITED, Cambridge (GB)

( * ) Notice: Subject to any disclaimer, the term of this patent is extended or adjusted under 35 U.S.C. 154(b) by 366 days.

(21) Appl. No.: 13/701,755

(22) PCT Filed: Jun. 3, 2011

(86) PCT No.: PCT/EP2011/059217
§ 371 (c)(1),
(2), (4) Date: Feb. 12, 2013

(87) PCT Pub. No.: WO2011/151455
PCT Pub. Date: Dec. 8, 2011

(65) Prior Publication Data
US 2013/0137333 A1 May 30, 2013

(30) Foreign Application Priority Data
Jun. 4, 2010 (GB) .................................. 1009402.7

(51) Int. Cl.
G02F 1/1345 (2006.01)
G02F 1/1333 (2006.01)
G02F 1/167 (2006.01)

(52) U.S. Cl.
CPC ........ *G02F 1/1345* (2013.01); *G02F 1/133305* (2013.01); *G02F 1/167* (2013.01); *G02F 2202/28* (2013.01)

(58) Field of Classification Search
CPC . G02F 1/1345; G02F 1/167; G02F 1/133305; G02F 1/13452
USPC ............................................ 156/60; 445/24
See application file for complete search history.

(56) References Cited

U.S. PATENT DOCUMENTS 5,556,670 A 9/1996 Mihara et al.
5,939,190 A 8/1999 Pfaff et al.
(Continued)

FOREIGN PATENT DOCUMENTS

EP 1 712 949 A1 10/2006
EP 1 992 983 A1 11/2008
(Continued)

OTHER PUBLICATIONS

British Search Report for GB 1009402.7 dated Oct. 14, 2011.
International Search Report for PCT/EP2011/059217 dated Jul. 21, 2011.

*Primary Examiner* — Karabi Guharay
(74) *Attorney, Agent, or Firm* — Sughrue Mion, PLLC

(57) ABSTRACT

A technique comprising: assembling together a front plane (1) comprising a first flexible substrate (4) supporting a display medium (6a) and a backplane (2) comprising a second flexible substrate (8) supporting an array of electronic elements (9) for controlling said display medium; and creating an electrically conductive connection between first and second conductive elements (5 10) on opposing faces of the frontplane and backplane by sandwiching an electrically conductive structure (3) between the frontplane and backplane in the region of the first and second conductive elements, wherein the conductive structure is at least more flexible than the least flexible one of the front plane and backplane.

14 Claims, 2 Drawing Sheets

(56) References Cited

U.S. PATENT DOCUMENTS

Figure 1:
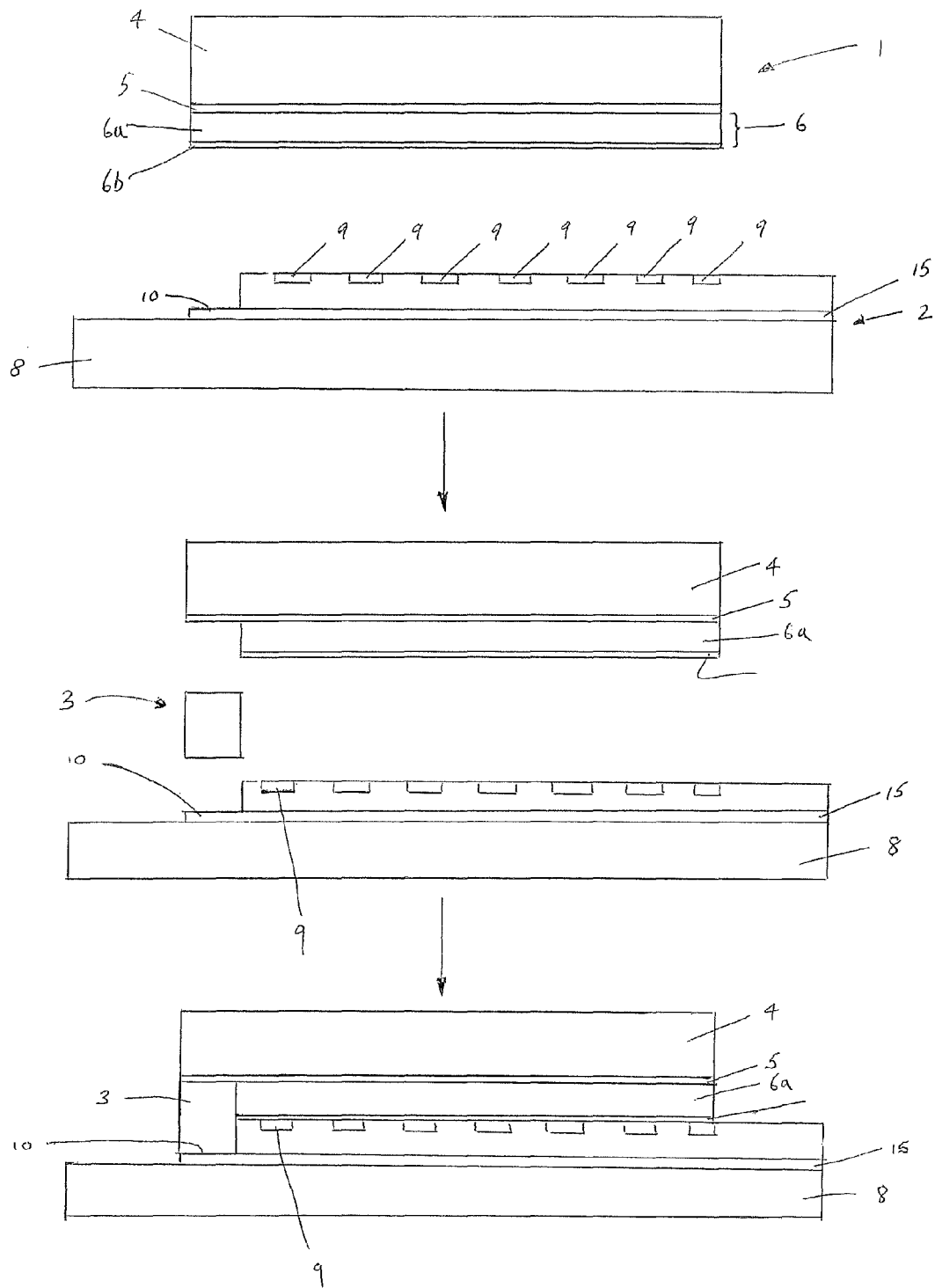

| | | | |
|---|---|---|---|
| 6,893,896 B1 | 5/2005 | Wagner | |
| 2008/0190553 A1* | 8/2008 | Ban et al. | 156/275.5 |
| 2010/0013787 A1 | 1/2010 | Takahashi et al. | |
| 2010/0187979 A1 | 7/2010 | Shim et al. | |
| 2012/0320542 A1* | 12/2012 | Jeong et al. | 361/749 |

FOREIGN PATENT DOCUMENTS

| | | |
|---|---|---|
| GB | 2474689 A | 4/2011 |
| GB | 2476840 A | 7/2011 |
| WO | 2008/002140 A1 | 1/2008 |

* cited by examiner

ASSEMBLING A FLEXIBLE DISPLAY

CROSS REFERENCE TO RELATED APPLICATIONS

This application is a National Stage of International Application No. PCT/EP2011/059217 filed Jun. 3, 2011, claiming priority based on British Patent Application No. 1009402.7 filed Jun. 4, 2010, the contents of all of which are incorporated herein by reference in their entirety.

The present invention relates to assembling two planar components of a display device. In one embodiment, it relates to assembling front and backplanes of a display device requiring an electrically conductive connection between the front and backplanes.

The production of a display device may involve the assembly of a frontplane including the display medium and a backplane comprising an array of thin-film transistors for controlling the display medium. The frontplane will generally also comprise a conductive element to which a drive voltage needs to be applied via the backplane. Although, this kind of technique can create a hard and wear-resistant conductive joint, the inventors have found that display devices in which the backplane and frontplane are made from organic polymer (plastic) substrates can be susceptible to a loss of drive voltage for the front plane conductive element when made using this kind of technique.

It is an aim of the present invention to provide a technique by which such losses of drive voltage can be better avoided.

The present invention provides a method comprising: assembling together a front plane comprising a first flexible substrate supporting a display medium and a backplane comprising a second flexible substrate supporting an array of electronic elements for controlling said display medium; and creating an electrically conductive connection between first and second conductive elements on opposing faces of the frontplane and backplane by sandwiching an electrically conductive structure between the frontplane and backplane in the region of the first and second conductive elements, wherein the conductive structure is at least more flexible than the least flexible one of the front plane and backplane.

In one embodiment, the electrically conductive structure comprises an electrically conductive support structure with electrically conductive adhesive applied to opposite surfaces thereof.

In one embodiment, the electrically-conductive support structure comprises a metal planar structure.

In one embodiment, the electrically conductive structure is a conductive foil or a conductive sheet.

In one embodiment, the electrically conductive structure comprises adhesive with metal fibres or particles embedded therein.

In one embodiment, the adhesive is a pressure-sensitive adhesive.

In one embodiment, the array of electronic elements comprises an organic semiconductor material.

In one embodiment, the conductive structure is more flexible than the backplane.

In one embodiment, the first and second flexible substrates comprise organic polymer substrates.

In one embodiment, sandwiching said electrically conductive structure between the frontplane and backplane in the region of the first and second conductive elements is carried out with the second flexible substrate forming part of a sheet of flexible substrate material that has been processed in other regions to form additional backplanes.

The present invention also provides a display device: comprising an assembly of a front plane comprising a first flexible substrate supporting a display medium and a backplane comprising a second flexible substrate supporting an array of electronic elements for controlling said display medium; and further comprising an electrically conductive structure sandwiched between the frontplane and backplanes to create an electrically conductive connection between first and second conductive elements on opposing faces of the frontplane and backplane; wherein the conductive structure is at least more flexible than the least flexible one of the front plane and backplane.

Figure 2:
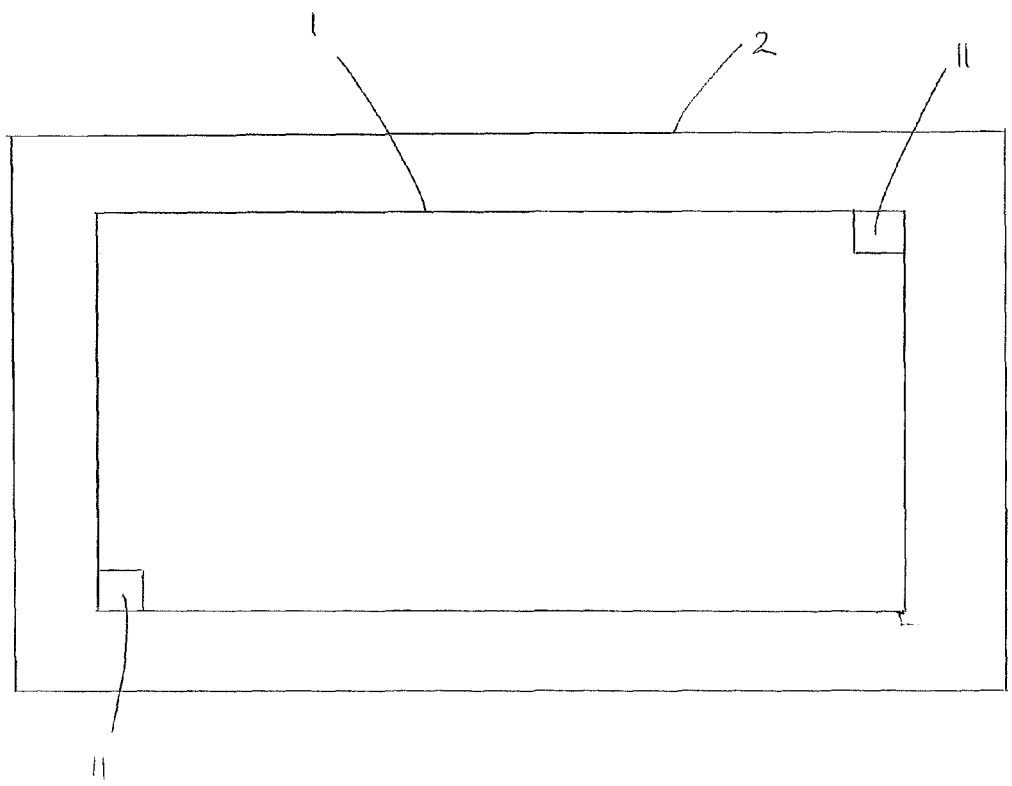

An embodiment of the invention is herebelow described in detail, by way of example only, with reference to the accompanying drawings, in which:

FIG. 1 illustrates a technique for assembling front and back planes of a display device in accordance with an embodiment of the present invention, involving the interposition of flexible conducting structure(s) between the front and back planes; and FIG. 2 further illustrates one example of where to provide such flexible conducting structures;

With reference to FIG. 1, the production of an electrophoretic display device involves the assembly of a backplane 2 and a front plane 1. The front plane 1 comprises a microcapsules element 6 (which incorporates a microcapsules layer 6a and an adhesive layer 6b, each microcapsule comprising regions of positively white charged pigment and negatively charged black pigment at their surface. An image is produced in the display by using drive circuitry (discussed below) to control which microcapsules present a white region to the viewer and which particles present a black region to the viewer. The microcapsule element 6 is fabricated on a transparent conductive element 5, such as ITO, which is in turn formed on a transparent plastic substrate 4, such as PET. The plastic PET substrate includes a thin transparent layer of indium-tin-oxide (ITO) 5 at the lower surface of the PET substrate 4 adjacent to the layer of microcapsules element 6. This ITO layer 5 serves as a reference voltage plane in the display device, and is also known as the pixel counter common (COM) electrode.

The backplane 2 has a thickness of about 188 microns, and comprises a plastic PET substrate 8 on which is supported an array of thin-film transistors (TFTs) defined by metal conductive elements and organic polymer semiconductor and dielectric materials. Some of the metal conductive elements (e.g. source/drain electrodes and source lines) for applying a bias to the source electrodes) are defined by a patterned lower metal layer 15. Each TFT is associated with a respective pixel electrode 9 at the front surface of the backplane 2.

In operation, the TFTs are used to independently switch the voltages at these pixel electrodes 9 between low and high voltages on either side of the COM electrode voltage in order to create the desired image in the microcapsule layer 6. In more detail, a display pixel generally defined by the area of the respective pixel electrode can be switched between black and white by reversing the orientation of the microcapsules for that display pixel, and the reversal of the orientation of the microcapsules is achieved by switching the direction of the electric field across the part of the microcapsule layer 6 for that display pixel.

In order to drive the COM electrode 5 at a voltage about which the pixel electrode voltages can be switched from low and high voltages (i.e. a voltage lower than the COM electrode voltage and a voltage higher than the COM electrode voltage), an electrical connection is created between the COM electrode 5 and the conductive element 10 which is designated as the COM contact pad at the front surface of the backplane 2, and which is part of the patterned lower metal layer 15. In the embodiment of the present invention, this is achieved by sandwiching between an exposed portion of the COM electrode 5 and the conductive element 10 at the front surface of the backplane a pad comprising a length of an electrically conductive adhesive tape 3. Where the frontplane 1 is supplied with the whole of the surface of the COM electrode covered by the microcapsule element 6, a portion of 6 is scratched away to expose one or more edge or corner portions of the COM electrode layer 5. This sandwiching of the adhesive tape section 3 is achieved in this embodiment by first applying the adhesive tape section to the surface of the exposed portion of the COM electrode 5, and then mounting the front plane on the back plane.

The electrically-conductive adhesive tape 3 comprises a copper tape coated on both sides with electrically conductive adhesive material. The electrically-conductive adhesive tape 3 is more flexible than both of the frontplane 1 and backplane 2. This ensures that a good and reliable electrical connection between the frontplane and backplane 2 is achieved even if there is some flexing of the display device. The provision of a display device that can flex to some degree and remain operational is one motivation for using plastic substrates for the front and back planes 1, 2 instead of more rigid substrates such as glass substrates.

The flexibility of a component is defined by its minimum bend radius, which is the smallest radius to which the component can be bent without damaging the component, or shortening the lifetime of the component. The minimum radius of the electrically-conductive adhesive tape 3 is the minimum radius to which the electrically-conductive adhesive tape 3 can be bent without causing a break in the electrically-conductive adhesive tape 3.

As mentioned below, according to one production technique, a plurality of backplanes are formed by processing a plurality of respective regions of a sheet of device substrate material which is itself secured to a rigid glass carrier, and the frontplanes are mounted on the backplanes before the device substrate material sheet is cut to separate the backplanes from each other and before the backplanes are released from the rigid glass carrier. In this case, the relevant bend radius value is the bend radius that a backplane would exhibit if the device substrate material sheet were cut to produce individual backplanes and the individual backplane was released from the rigid glass carrier before mounting the frontplane on the backplane.

In one example, the front plane has a bend radius of no less than about 50 mm; the backplane has a bend radius of no less than about 75 mm; and the flexible conductive adhesive tape has a bend radius of below 10 mm, more particularly between 1 mm and 10 mm, and more particularly about 1 mm. The thickness of the electrically-conductive adhesive tape is selected to be greater than the size of the gap between the COM electrode layer 5 and the conductive element 10, such that the adhesive tape will be slightly compressed to ensure contact with both surfaces 10 and 5. In this example, the gap height is about 55 microns, arising from the combined thickness of the microcapsule element 6 and the height difference between the upper surface of the pixel electrodes 9 and the upper surface of the COM contact pad 10.

The area of the electrical connection between the COM electrode 5 and the conductive element 10 at the front surface of the backplane 2 is selected so as to provide a joint having a sufficiently low electrical resistance.

In this embodiment, two connections are made between the COM electrode and the backplane power source via two conductive elements 10 arranged at diagonally opposite corners of the frontplane 1, as illustrated in FIG. 2.

The creation of the electrical connection using an electrically-conductive adhesive tape is advantageous from the point of view of (i) improving the lifetime of the display device, due to increased flexibility; (ii) reducing the number of process steps; and (iii) facilitating a high precision of alignment between the front and back planes 1, 2.

For example, the use of an electrically-conductive adhesive tape as described above for this embodiment involves less process steps than applying a liquid conductive resin to one or both of the COM electrode 5 and COM contact pad 10, and curing the conductive resin after assembly of the front and back planes.

According to one production technique, a plurality of backplanes are formed by processing a plurality of respective regions of a sheet of device substrate material (which is itself secured to a rigid carrier), and mounting the frontplanes on the backplanes before the device substrate material sheet is cut to separate the backplanes from each other. In this case, the step of first applying the electrically conductive adhesive tape 3 to the front plane before mounting the front plane on the back plane can facilitate accurate positioning of the electrically conductive tape sections 3. Another option is to first apply the electrically adhesive tape sections 3 to the backplanes before mounting the front planes on the backplanes, but this would involve the tool used to apply the electrically adhesive tape sections 3 having to travel over relatively large distances between the backplanes on the carrier. It is generally more challenging to achieve a high degree of accuracy when moving tools over relatively large distances.

Other examples of flexible conductive materials for creating the electrical connection between the front and back planes 1, 2 are: pressure-sensitive adhesive loaded with an electrically conductive material such as nickel; metal foil such as copper foil; carbon conductive sheet; silver conductive sheet, and acrylic adhesive loaded with metal fibres such as nickel fibres.

We have chosen the example of an electrophoretic display device to describe a technique according to an embodiment of the invention, but the above-described technique is also applicable to other kinds of display devices such as liquid crystal display devices.

In addition to any modifications explicitly mentioned above, it will be evident to a person skilled in the art that various other modifications of the described embodiment may be made within the scope of the invention.

The invention claimed is:
1. A method comprising:
   assembling together a front plane comprising a first flexible substrate supporting a display medium and a backplane comprising a second flexible substrate supporting an array of electronic elements for controlling said display medium; and
   creating an electrically conductive connection between first and second conductive elements on opposing faces of the frontplane and backplane by sandwiching an electrically conductive structure between the frontplane and backplane in the region of the first and second conductive elements,
   wherein the conductive structure has a minimum bend radius smaller than at least one of the front plane and backplane and has a minimum bend radius of below 10 mm.
2. The method according to claim 1, wherein the electrically conductive structure comprises an electrically conduc- tive support structure with electrically conductive adhesive applied to opposite surfaces thereof.

3. The method according to claim 1, wherein the electrically-conductive support structure comprises a metal planar structure.

4. The method according to claim 1, wherein the electrically conductive structure is a conductive sheet.

5. The method according to claim 1, wherein the electrically conductive structure comprises adhesive with metal fibres or particles embedded therein.

6. The method according to claim 5, wherein the adhesive is a pressure-sensitive adhesive.

7. The method according to claim 1, wherein the array of electronic elements comprises an organic semiconductor material.

8. The method according to claim 1, wherein the conductive structure has a minimum bend radius smaller than the backplane.

9. The method according to claim 1, wherein the first and second flexible substrates comprise organic polymer substrates.

10. The method according to claim 1, wherein the sandwiching said electrically conductive structure between the frontplane and backplane in the region of the first and second conductive elements is carried out with the second flexible substrate forming part of a sheet of flexible substrate material that has been processed in other regions to form additional backplanes.

11. A method according to claim 1, wherein the electrically conductive structure is a conductive foil.

12. A method according to claim 1, wherein the conductive structure has a minimum bend radius of about 1 mm.

13. A display device comprising:
an assembly of a front plane comprising a first flexible substrate supporting a display medium and a backplane comprising a second flexible substrate supporting an array of electronic elements for controlling said display medium; and
an electrically conductive structure sandwiched between the frontplane and backplanes to create an electrically conductive connection between first and second conductive elements on opposing faces of the frontplane and backplane;
wherein the conductive structure has a minimum bend radius smaller than at least one of the front plane and backplane and has a minimum bend radius of below 10 mm.

14. A method comprising:
assembling together a front plane comprising a first flexible substrate supporting a display medium and a backplane comprising a second flexible substrate supporting an array of electronic elements for controlling said display medium; and
creating an electrically conductive connection between first and second conductive elements on opposing faces of the frontplane and backplane by sandwiching an electrically conductive solid structure between the frontplane and backplane in the region of the first and second conductive elements,
wherein the conductive solid structure has a minimum bend radius smaller than at least one of the front plane and backplane and has a minimum bend radius of below 10 mm.

* * * * *